United States Patent
Bohn et al.

(10) Patent No.: US 10,339,614 B2
(45) Date of Patent: *Jul. 2, 2019

(54) WASTE ANALYSIS SYSTEM AND METHOD

(71) Applicant: International Business Machines Corporation, Armonk, NY (US)

(72) Inventors: Timothy T. Bohn, Simi Valley, CA (US); Natalie N. Brooks Powell, Bolingbrook, IL (US); Gary W. Crupi, Pewaukee, WI (US); Ho-Yiu Lam, Mountain View, CA (US); David C. Martin, San Jose, CA (US); Sandhya ReddyVeera, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/140,942

(22) Filed: Sep. 25, 2018

(65) Prior Publication Data

US 2019/0026844 A1    Jan. 24, 2019

Related U.S. Application Data

(63) Continuation of application No. 15/433,355, filed on Feb. 15, 2017, now Pat. No. 10,121,211.

(51) Int. Cl.
*G06K 9/46* (2006.01)
*G06K 9/62* (2006.01)
(Continued)

(52) U.S. Cl.
CPC ......... *G06Q 50/12* (2013.01); *G06F 17/278* (2013.01); *G06K 9/4604* (2013.01);
(Continued)

(58) Field of Classification Search
CPC .. G06Q 50/12; G06Q 10/06315; G06Q 10/30; G06F 17/278; G06K 9/6267;
(Continued)

(56) References Cited

U.S. PATENT DOCUMENTS 9,424,495 B1    8/2016   Trevino
2002/0188495 A1  12/2002  Banerjee et al.
(Continued)

FOREIGN PATENT DOCUMENTS

KR    20110000217 A    1/2011
WO    2015162417 A1   10/2015

OTHER PUBLICATIONS

Hannan et al., "Image Acquisition for Solid Waste Bin level Classification and Grading", Journal of Applied Sciences Research, 8(6): 2012, pp. 3092-3096.
(Continued)

*Primary Examiner* — Brenda C Bernardi
(74) *Attorney, Agent, or Firm* — Nicholas D. Bowman; Maxine L. Barasch; Keohane & D'Alessandro PLLC (57) ABSTRACT

Embodiments of the present invention provide techniques for identifying and quantifying waste in a process. Waste information is input via images and/or natural language. The amount of waste is estimated based on information in images and/or a natural language description. A computer-implemented technique extracts metadata on waste products from the images and/or natural language description. A variety of factors such as social media trends, weather, traffic, and/or sports schedules are evaluated by the computer and used in predicting the amount of waste that will occur.

20 Claims, 8 Drawing Sheets

(51) Int. Cl.

| | | |
|---|---|---|
| *G06N 5/04* | (2006.01) | |
| *G06T 7/00* | (2017.01) | |
| *G06F 17/27* | (2006.01) | |
| *G06Q 10/00* | (2012.01) | |
| *G06Q 10/06* | (2012.01) | |
| *G06Q 50/12* | (2012.01) | |
| *G10L 15/26* | (2006.01) | |

(52) U.S. Cl.
CPC .......... *G06K 9/4652* (2013.01); *G06K 9/6267* (2013.01); *G06N 5/046* (2013.01); *G06Q 10/06315* (2013.01); *G06Q 10/30* (2013.01); *G06T 7/0004* (2013.01); *G10L 15/26* (2013.01); *G06K 2209/17* (2013.01); *G06K 2209/27* (2013.01); *G06T 2207/10024* (2013.01); *G06T 2207/20076* (2013.01); *G06T 2207/30128* (2013.01); *G06T 2207/30242* (2013.01); *Y02W 90/20* (2015.05)

(58) Field of Classification Search
CPC .............. G06K 9/4652; G06K 9/4604; G06K 2209/17; G06K 2209/27; G06N 5/046; G10L 15/26; G06T 7/0004; G06T 2207/30128; G06T 2207/30242
See application file for complete search history.

(56) References Cited

U.S. PATENT DOCUMENTS

| | | |
|---|---|---|
| 2005/0154560 A1 | 7/2005 | Fitzpatrick et al. |
| 2006/0015289 A1 | 1/2006 | Shakman et al. |
| 2006/0218057 A1 | 9/2006 | Fitzpatrick et al. |
| 2007/0254080 A1 | 11/2007 | Schackmuth et al. |
| 2009/0271243 A1 | 10/2009 | Sholl et al. |
| 2011/0040660 A1 | 2/2011 | Allison et al. |
| 2017/0069222 A1 | 3/2017 | Mekhsian et al. |
| 2017/0203987 A1 | 7/2017 | McMahon et al. |
| 2018/0018601 A1 | 1/2018 | Wansink |

OTHER PUBLICATIONS

Wilson, Andrew, Vision Software Blends into Food Processing, Vision Systems Design, Jun. 1, 2012, 7 pgs.
Unknown, "Waste Coach", http://waste-coach.eu/, Jul. 9, 2015, 2 pgs.
Unknown, "Saffron", saffrontech.com, 2015, 10 pgs.
Noronha et al., "PlateMate: Crowdsourcing Nutrition Analysis from Food Photographs", UIST 11, Oct. 16-19, 2011, 12 pgs.
Park et al., "Extracting Salient Keywords from Instructional Videos Using Joint Text, Audio and Visual Cues", Proceedings of the Human Language Technology Conference of the North American Chapter of the ACL, Jun. 2006, pp. 109-112.
Menich, Ron, "Machine Learning: Can Science Help Retailers Recover the Art of Customer Intimacy?", http://www.predictix.com/machine-learning-for-retailers/, Jul. 10, 2015, 4 pgs.
Shakman, Andrew, "Source Reduction", LeanPath Food Waste Prevention, The Last Food Mile Conference, Dec. 8, 2014, 40 pgs.
Haugan, Janet, "Go Green Tomato Brings First Tablet-Based Smart Food Waste Monitoring to the UK Market", LeanPath Food Waste Prevention, Jun. 11, 2015, 8 pgs.
Unknown, "Food Waste: Impact Analysis and Reduction", http://www.cleanmetrics.com/html/food_waste_offerings.htm, Jul. 27, 2012, 2 pgs.
Bankson, Amy, "New business app designed to reduce food waste", MIT News, May 29, 2015, 3 pgs.
Aida, "16 Tips for Restaurant Food Waste Reduction", http://possector.com/management/restaurant-food-waste-reduction, Apr. 11, 2015, 12 pgs.
Brenda C. Bernardi, USPTO Office Action, U.S. Appl. No. 15/433,355, dated Feb. 16, 2018, 14 pages.
Brenda C. Bernardi, USPTO Notice of Allowance, U.S. Appl. No. 15/433,355, dated Jun. 26, 2018, 12 pages.

WASTE ANALYSIS SYSTEM AND METHOD

RELATED APPLICATIONS

The present patent document is a continuation of U.S. patent application Ser. No. 15/433,355 filed Feb. 15, 2017, the entire contents of which is incorporated herein by reference.

FIELD OF THE INVENTION

Embodiments of the invention relate to waste analysis systems and methods.

BACKGROUND

Food service businesses, such as restaurants, cafés, cafeterias, etc. waste a large amount of food every year. In addition to this being unfortunate since hunger is still a big problem in the U.S. and around the world, it is also bad for the food service business's bottom line. When more food is purchased than needed, the food may spoil, and the money spent on that food is wasted. With many food service operations running on very small margins, improved methods and systems of predicting and preventing waste are needed.

SUMMARY

In one aspect, there is provided a computer-implemented method for identifying waste in a process, comprising: acquiring metadata for a discarded product in a waste product analysis system computer comprising a processor, wherein the processor performs functions of: recording the metadata; analyzing the metadata with a rules engine to derive a suggestion for waste reduction; and generating a report based on the recorded metadata, wherein the report includes the suggestion for waste reduction.

In another aspect, there is provided a computer system comprising: a processor; a memory coupled to the processor, the memory containing instructions, that when executed by the processor, perform the steps of: acquiring metadata for a discarded product; recording the metadata; analyzing the metadata with a rules engine to derive a suggestion for waste reduction; and generating a report based on the recorded metadata, wherein the report includes the suggestion for waste reduction.

In yet another aspect, there is provided a computer program product for identifying waste in a process, for an electronic computing device comprising a computer readable storage medium having program instructions embodied therewith, the program instructions executable by a processor to cause the electronic device to: acquire metadata for a discarded product; record the metadata; analyze the metadata with a rules engine to derive a suggestion for waste reduction; and generate a report based on the recorded metadata, wherein the report includes the suggestion for waste reduction.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide techniques for identifying and quantifying waste in a process. Waste information is input via images and/or natural language. The amount of waste is estimated based on information in images and/or a natural language description. A variety of non-limiting factors such as social media trends, weather, traffic, and/or sports schedules are used in predicting the amount of waste that will occur.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

Figure 1:
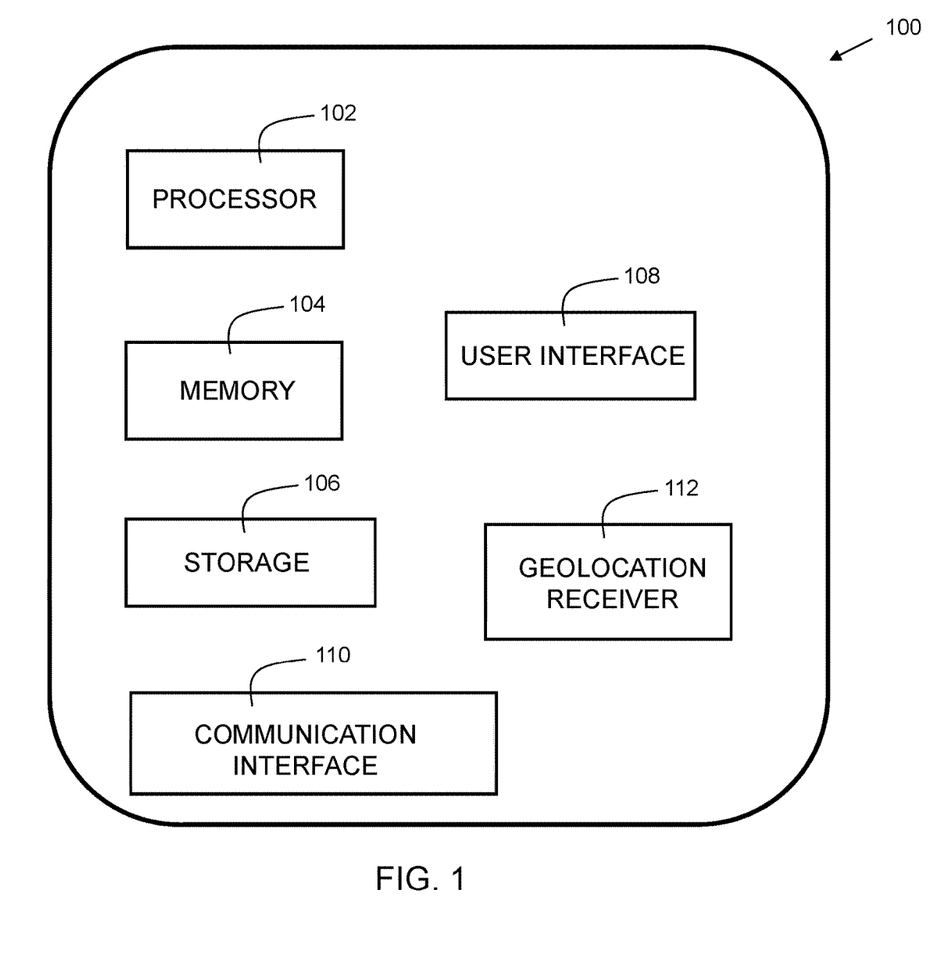
FIG. 1 is a block diagram of a device in accordance with embodiments of the present invention.

FIG. 1 is a block diagram of a device 100 in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of the present invention. In embodiments, device 100 may have multiple processors 102, and/or multiple cores per processor.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 further includes a user interface 108, examples of which include a liquid crystal display (LCD), a plasma display, a cathode ray tube (CRT) display, a light emitting diode (LED) display, an organic LED (OLED) display, or other suitable display technology. The user interface 108 may include a keyboard, mouse, and/or a touch screen, incorporating a capacitive or resistive touch screen in some embodiments.

The device 100 further includes a communication interface 110. In some embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

The device 100 further includes a geolocation receiver 112. Receiver 112 receives geolocation data, from sources such as Global Positioning System (GPS), GLONASS, or other suitable geolocation systems.

Figure 2:
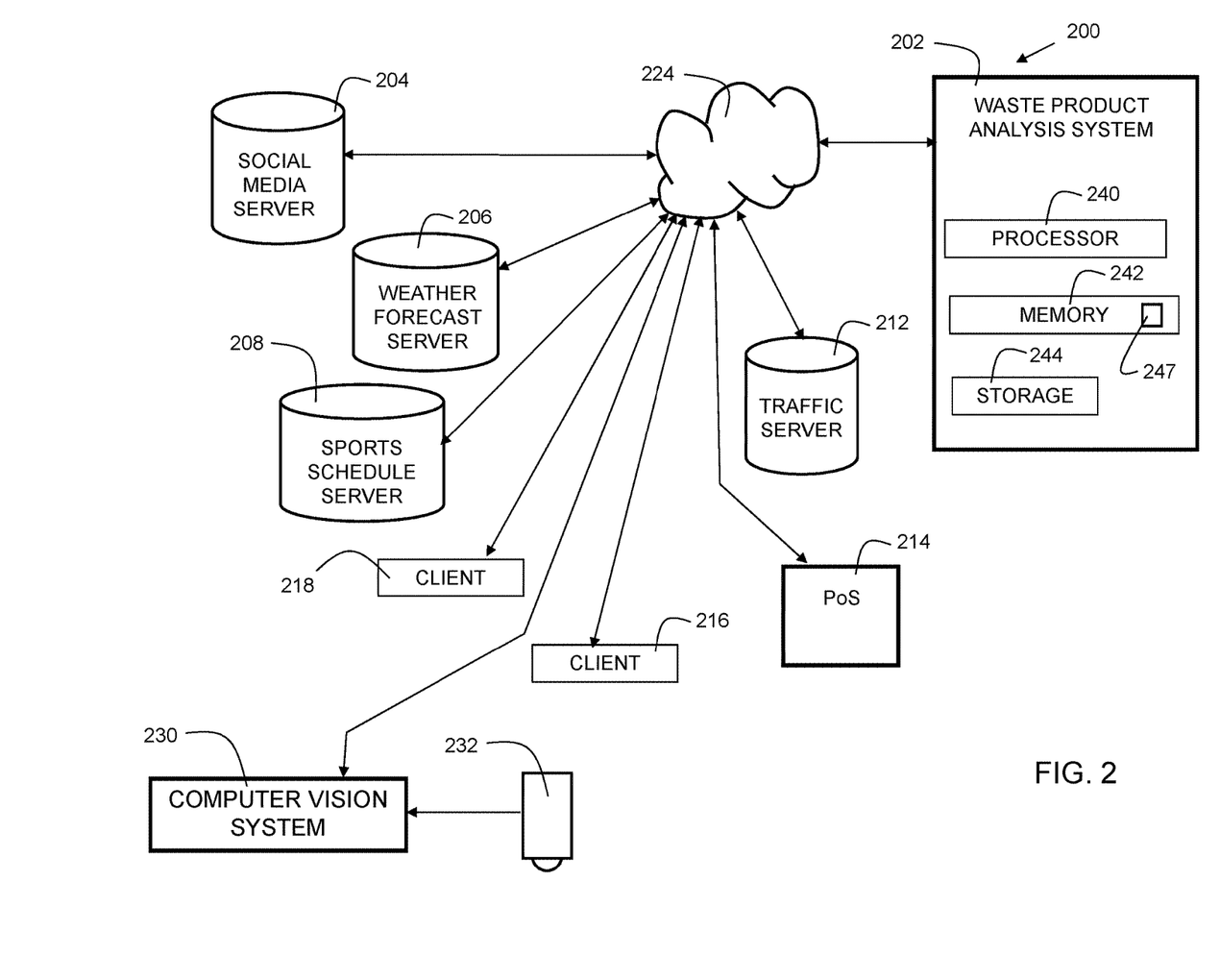
FIG. 2 shows an environment for implementation of embodiments of the present invention.

FIG. 2 shows an environment 200 for implementation of embodiments of the present invention. Waste product analysis system 202 includes a processor 240, memory 242, and storage 244. A set of instructions 247 is stored in memory 242 for execution by the processor 240 to implement embodiments of the invention. System 202 is in communication with network 224. Network 224 may be the Internet, a wide area network, a local area network, a virtual private network, a cloud network, or any other suitable network.

Waste product analysis system 202 acquires metadata for a discarded product and records the metadata. Waste product analysis system 202 may extract the metadata from information transmitted from client devices of users. Client devices 216 and 218 are devices that users use to, among other things, input data for transmission over the network 224 to system 202. Client devices 216 and 218 may be mobile phones, smartphones, tablet computers, desktop computers, laptop computers, or any other suitable device. It should be recognized that although only two client devices are shown, more or fewer may be included within the scope and spirit of the invention. Information about waste may be input to a client device using an onboard, attached, or wirelessly coupled microphone, physical keyboard or touch screen, camera, or other input mechanism. The data may be captured through speech analysis (speech-to-text), image analysis, or other suitable mechanism.

Computer vision system 230 is also in communication with network 224. Computer vision system 230 is in communication with camera 232 or other device for capturing data about waste (for example, a barcode scanner, RFID tag scanner, etc.). Camera 232 takes images of waste. The waste may be on a conveyor belt, as discussed further with regard to FIG. 3. Computer vision system 230 may process images and send one or more of such images to waste product analysis system 202 for further processing.

Waste product analysis system 202 analyzes the information received from client devices and/or computer vision system 230 to derive metadata about wasted products. System 202 also generates a report based on the recorded metadata related to factors such as social media trends, weather forecasts, traffic reports, and sports schedules. The report may include a set of data. The set of data may include (at least one) suggestions for waste reduction. Another example of included data is an indicator of potential waste (i.e. an indication that due to one or more factors, there is a potential for waste).

Embodiments may include using social media data to derive the indicator of potential waste. Social media server 204 may store social media data from social networking websites, like Facebook®, Twitter®, etc. System 202 may analyze data received from social media server 204 to determine if any trends may be detected. For example, system 202 may use language analysis to analyze keyword data to determine that 100 people within 25 miles of a restaurant have used the terms "going on vacation" or "leaving town" in social media posts within the past two days. Accordingly, the suggestion in the report to the restaurant may be to order less food for the coming week since, unlike usual, many people will not be around town.

Embodiments may include using weather data to derive the indicator of potential waste. Weather forecast server 206 may store weather data, such as weather reports and predictions received from media outlets, or governmental and quasi-governmental weather prediction services, such as the National Weather Service, etc. System 202 may analyze weather data received from the weather forecast server, and determine based thereon, that a storm is coming. Based on evaluation of historical data, the system 202 may correlate that when big storms hit in the particular geographical area at issue, there is a surge in people ordering take-out food. Accordingly, the suggestion may include ordering more ingredients in advance of the storm.

Embodiments may include using traffic data to derive the indicator of potential waste. Traffic server 212 may store data relating to traffic patterns received from media reports, government agency reports, crowdsourced traffic data, etc. System 202 may analyze the data received from server 212, and based on the analysis determine that due to construction near a restaurant, there will be traffic delays in the vicinity for a week. Based on an evaluation of historical data, system 202 may determine that nearby traffic jams correlate with fewer customers visiting the restaurant. Accordingly, system 202 makes a suggestion to decrease the number of pizzas to be prepared compared to a typical/average week, and therefore an appropriate amount of supplies are purchased for that week.

Embodiments may include using sports schedule data to derive the indicator of potential waste. Sports schedule server 208 may store data relating to sports games. The information may be stored in, e.g., an electronic calendar and/or database. System 202 may analyze the data received from server 208. Based on the analysis, system 202 may determine that there are three college football games occurring in the coming week. Based on an evaluation of historical data, system 202 may determine that a college football game correlates with more customers calling for delivery of food. Accordingly, system 202 makes a suggestion to increase the number of pizzas prepared, and therefore appropriate supplies purchased, for that week.

It should be recognized that the above-identified sets of data, analysis, evaluations, etc., are examples, and that in implementations of embodiments, more, fewer, or different steps, servers, data, and reporting may be included without departing from the scope of the invention.

Point of Sale (PoS) system 214 represents a computer terminal where customer orders, such as food orders, are entered. The PoS 214 records the types of items sold and the amount of each item sold. This information can be provided to the waste product analysis system 202. The system 202 can obtain historical consumption data based on records from the PoS system 214. Weekly, monthly, and yearly trends can be analyzed to predict when a condition for potential waste can occur. For example, if the system 202 identifies a trend that during the first week of each month consumption of a product is lower than the other weeks of the month, then the report can suggest purchasing less perishable food inventory for the first week of the month.

Figure 3:
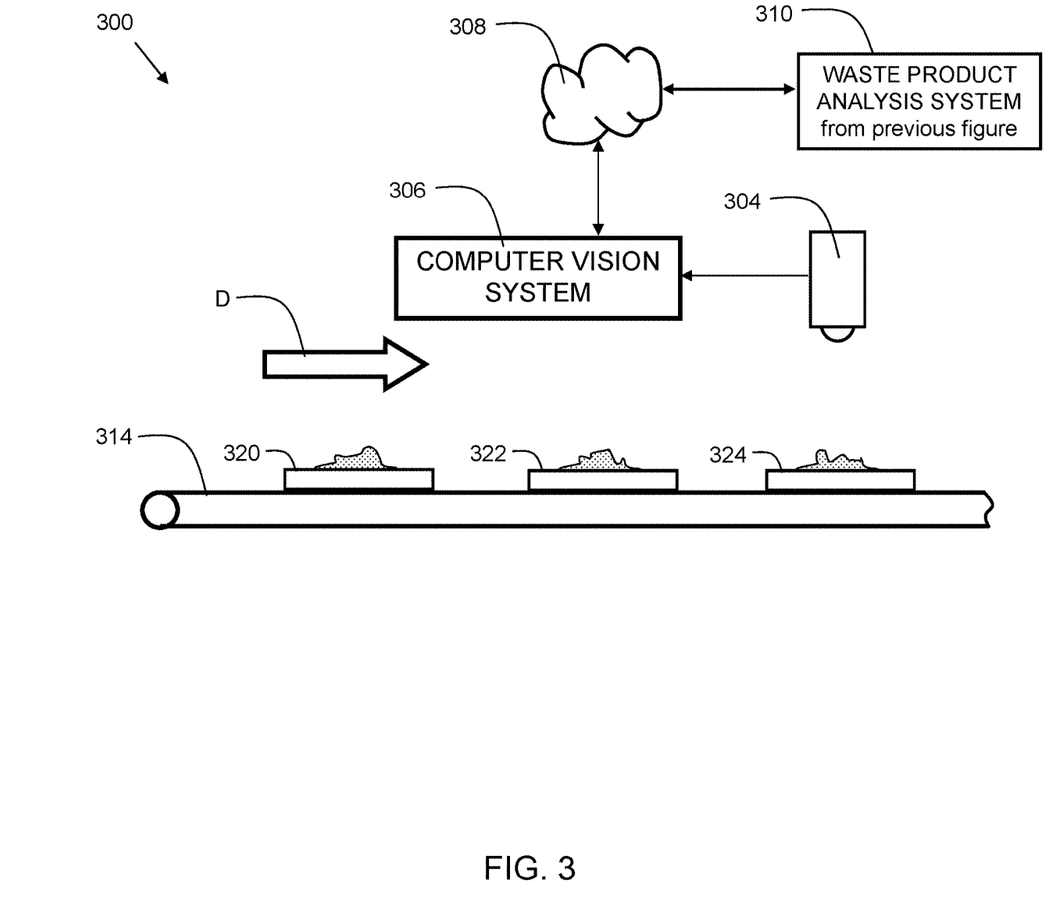
FIG. 3 shows an example of an image-based embodiment of the present invention.

FIG. 3 shows an example of an image-based embodiment 300 of the present invention. As shown, in the example, there is a conveyor belt 314 where customers place their trays when finished in a cafeteria. The trays, examples shown as 320, 322, and 324, having the trash/leftovers on top are moved by the conveyor belt 314 in direction D toward the trash center on the conveyor belt. Waste product analysis system 310 is similar to the waste product analysis system 202 of FIG. 2. It communicates over network 308 (similar to network 224 of FIG. 2) with computer vision system 306.

Computer vision system 306 is coupled with camera 304. An image of the discarded product is received. In the example embodiment, computer vision system 306 receives a set of (at least one) images from camera 304. An object recognition process is performed on the received image to identify one or more discarded products within the image. The object recognition process may perform a variety of image processing techniques such as edge detection, shape detection, clustering, and/or probabilistic classifiers to determine the discarded objects. Image metadata is extracted from the received image based on the object recognition process.

The object recognition analysis may include performing an edge detection process to determine the outer edges of the objects on the tray (i.e. the items for discarding). The computer vision system may include a database having the shapes of various foods stored therein. For example, the shape of a pear may be stored in association with "pear". The shape of an apple may be stored in association with "apple". For edge detection, some embodiments may utilize a Canny edge detector algorithm. Some embodiments may utilize mathematical models, such as a deformable contour model, and/or an active shape model for detection of the discarded objects.

The object recognition analysis may instead, or in addition to, perform a color analysis. Computer vision system 306 may include a database that includes information about food objects in association with their colors. For example, it may associate the color green with legumes. It may associate red with ketchup and tomatoes.

In embodiments, metadata is acquired for a discarded product. In some embodiments, the discarded product is a discarded food product. In embodiments, performing an object recognition process further comprises using one or more image classifiers. The image classifiers can be trained using a supervised learning technique.

In some embodiments, an object count process is performed on the received image. Sales data is received for a predetermined time duration from a point of sale system, and an amount of used product during the predetermined time duration is determined based on the received data. The rules engine determines an overage amount of product as a function of the acquired metadata for the discarded product and a factor of the amount of used product. Accordingly, a recommendation can then be made based on how much product was sold, and how much was discarded. For example, if the restaurant normally sells 100 tomatoes per day, and it is determined that on average 30 per day are discarded, the system 202 can recommend reducing the number of tomatoes to be purchased in future orders. A margin of error may be established (for example, 10 percent). System 202 may accordingly calculate that 100 tomatoes were sold, and 10% of that is 10, so since 30 tomatoes per day are being discarded, the recommendation would be to cut back to purchase 20 less tomatoes per day. This leaves a 10 percent margin to cover a positive fluctuation in sales.

Figure 4:
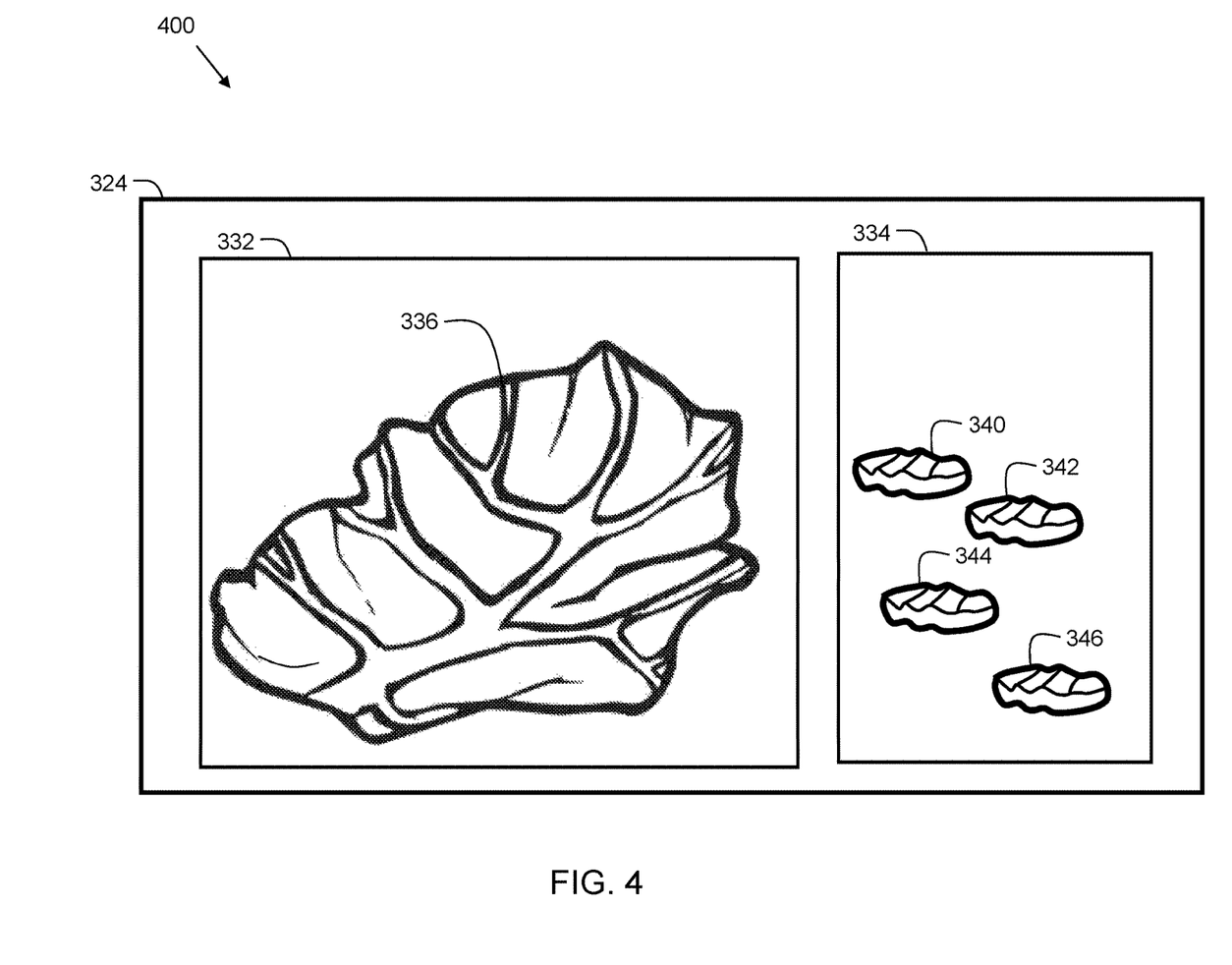
FIG. 4 shows an example image for an image-based embodiment of the present invention.

FIG. 4 shows an example image 400 for an image-based embodiment of the present invention. In the example, the image is taken from above a food tray 324. The food tray has two compartments 332 and 334. Lettuce leaf 336 is in the first compartment 332, and some pickle slices 340, 342, 344, and 346 are left over in compartment 334. In embodiments, acquiring metadata for a discarded product comprises acquiring metadata for a food product. Metadata, and/or attributes like shape and color of a food product like an apple may be acquired initially and stored in a database, so that a discarded apple can be recognized by the computer vision system when it is discarded. Embodiments may include performing an object count process on the received image. In the example, the embodiment will count one piece of lettuce and four pickle slices. Based on the computer-implemented analysis, a cafeteria may make menu changes to reduce waste. Based on the previous example, the cafeteria may substitute a piece of wax paper for the lettuce, and only include two pickle slices instead of four, as an example.

In some embodiments, when objects in the image cannot be recognized with a high confidence level, the user may be prompted to enter additional information regarding the waste that is shown in one or more images. For example, based on what is shown in FIG. 4, if the system cannot identify the objects 340, 342, 344, and 346 as pickles, it may prompt the user to identify those objects in the image. Over time, using image classifiers, neural networks, or other suitable machine learning techniques, the system may learn to recognize various waste items.

Figure 5:
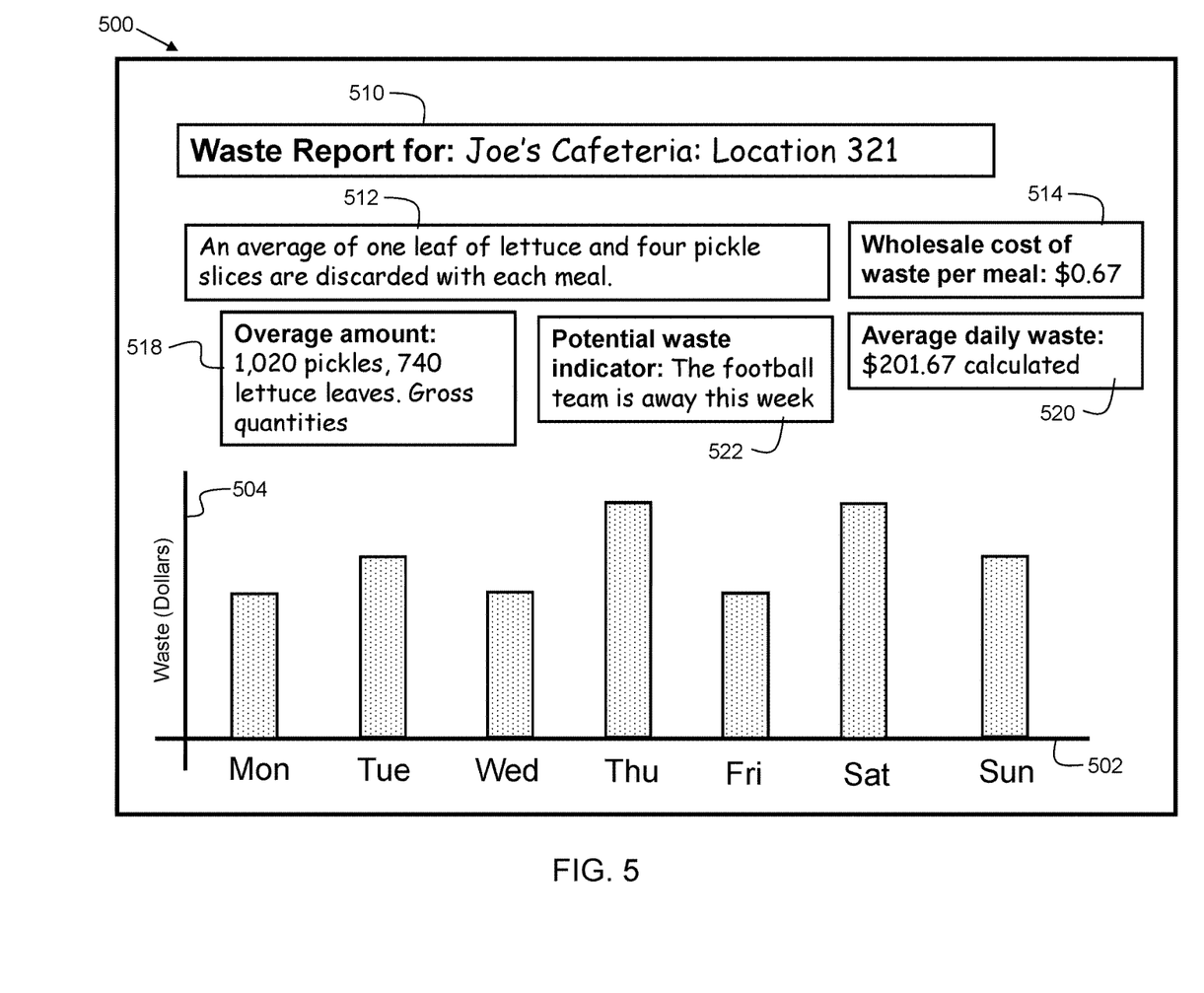
FIG. 5 shows an example report generated in accordance with embodiments of the present invention.

FIG. 5 shows an example report 500 generated in accordance with embodiments of the present invention. Generating the report may include several steps, and the report may include several elements. The report includes the location to which it corresponds, at 510. The location may be extracted from memory of a previously stored manually entered user input, or determined from a geolocation receiver using, e.g., a global positioning satellite system, such as GPS. In the embodiments where photographs of waste are uploaded from a mobile device for further analysis, location data, such as longitude and latitude in an image header, may be used to determine a location. In cases where a business has multiple locations, using location information allows an analysis of waste in each location. The waste output of each location can be compared, and locations outputting the most waste can be further examined to determine if there are any ways to address the higher levels of waste output.

In some embodiments, generating the report may include calculating average daily waste, shown at 512. In the example, the calculation indicates that an average of one leaf of lettuce and four pickle slices are discarded with each meal.

In some embodiments, generating the report may include calculating an average wholesale cost of waste per meal, shown at 514. For example, the amount of waste per day over an amount of time (for example, one week or 30 days), is totaled. That number is then divided by the number of days. The result is then divided by the number of meals per day served by the establishment.

In some embodiments, generating the report may include determining an overage amount of used product during a predetermined time duration, shown at 518. The overage amount provides an indication of the amount of waste (discarded product). In some embodiments, analyzing the metadata with a rules engine comprises receiving sales data for a predetermined time duration from a point of sale system and determining an amount of used product during the predetermined time duration based on the received data. The rules engine determines an overage amount of product as a function of the acquired metadata for the discarded product and a factor of the amount of used product. In the example, it is 1,020 pickles and 740 lettuce leaves that are determined to be the overage amount for the predetermined week. The determination of the overage amount may include a margin based on sales reported from a Point of Sale (Pos) system.

In some embodiments, generating the report may further include generating an indicator of potential waste, shown at 522. Embodiments may include using an electronic calendar from a sports schedule server to extract data. In the example, an electronic calendar of a sports team schedule is used to derive the indicator of potential waste. For example, if there is an away professional baseball game, and the restaurant is located instead near the home stadium, the away game may indicate a likelihood of potential waste since people will not be nearby.

In some embodiments, generating the report may further include calculating average daily waste, shown at 520. This calculation can be made by aggregating the determined daily waste over a period of time. For example, it may be calculated over the period of a week. In the case, the total amount of waste from the week can be divided by seven days, for a total of the average daily waste.

In some embodiments, generating the report may further include rendering a trend graph. In the example, a chart is shown having waste amount in dollars on the y-axis at 504 and the days of the week on the x-axis at 502. Bar indicators show the amount of waste in dollars per day.

It should be recognized that in some embodiments, the generating of the report may include more or fewer steps where feasible. It should also be recognized that the report may include more or fewer elements displayed thereon.

Figure 6:
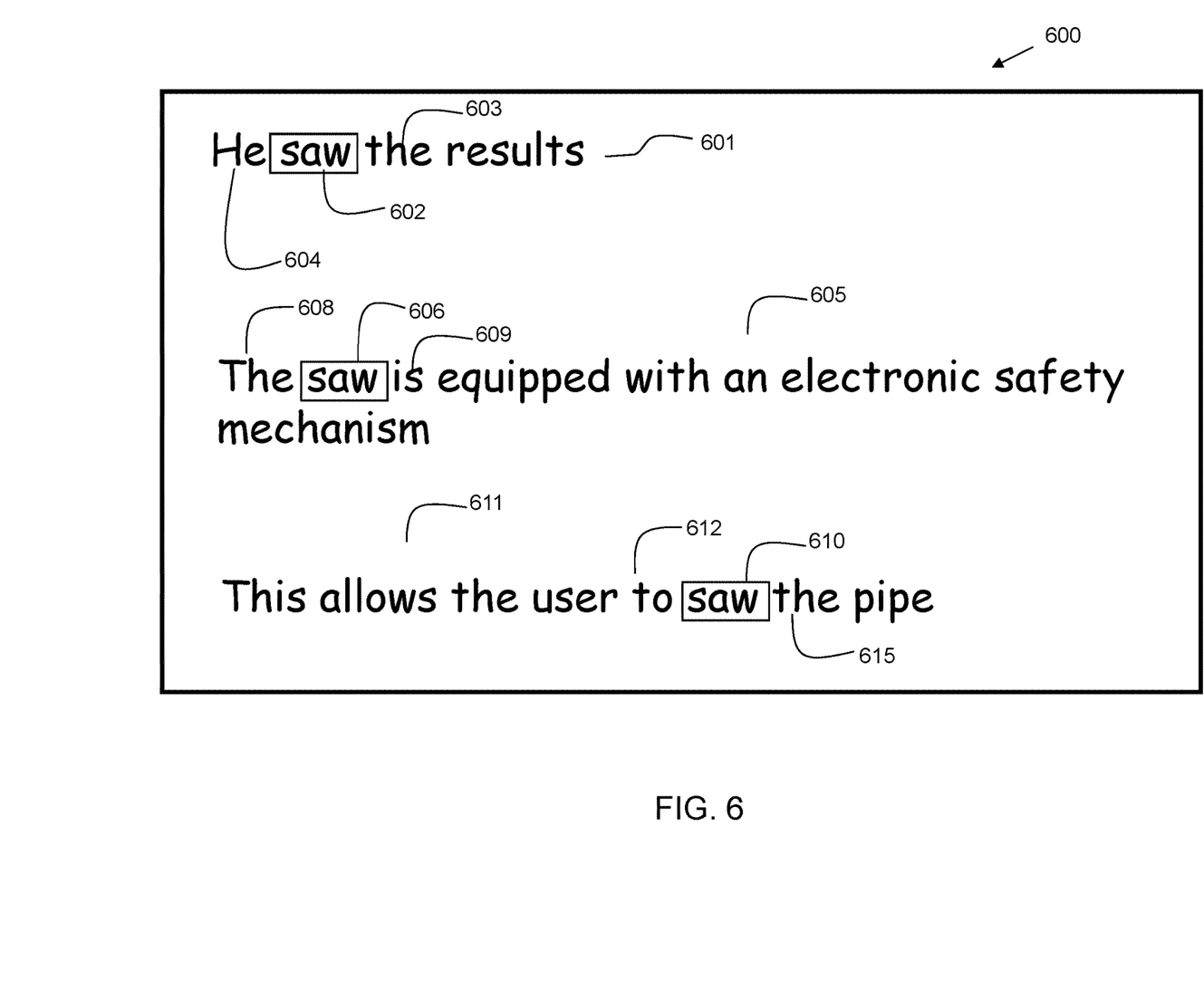
FIG. 6 shows an example of disambiguation in accordance with embodiments of the present invention.

FIG. 6 shows an example 600 of disambiguation in accordance with embodiments of the present invention. Disambiguation is one of the processes that may be utilized in embodiments of the present invention. As part of content ingest, text may be tokenized into words and tagged with parts of speech. For some words, there can be more than one meaning and/or part of speech. FIG. 6 shows a disambiguation example with the word "saw." In phrase 601, the word "saw" 602 is used as a past tense verb. In embodiments, a machine learning natural language analysis module may identify the prior token 604 to the word "saw" as a pronoun, and the following token 603 as an article. In training a classifier, the pattern of pronoun-token-article may be associated with a verb, and thus the token is interpreted as a verb.

In phrase 605, the word "saw" 606 is a noun for a cutting tool. In embodiments, a machine learning natural language analysis module may identify the prior token 608 to the word saw as an article, and the following token 609 as a verb. In training a classifier, the pattern article-token-verb may be associated with a noun, and thus the token is interpreted as a noun.

In phrase 611, the word "saw" 610 is a noun for a cutting tool. In embodiments, a machine learning natural language analysis module may identify the prior token 612 to the word "saw" as part of an infinitive form, and the following token 615 as an article. In training a classifier, the pattern "to"-token-article may be associated with a verb, and thus the token is interpreted as a verb. These classifiers and techniques for disambiguation are merely examples, and other classifiers and techniques are possible.

Figure 7:
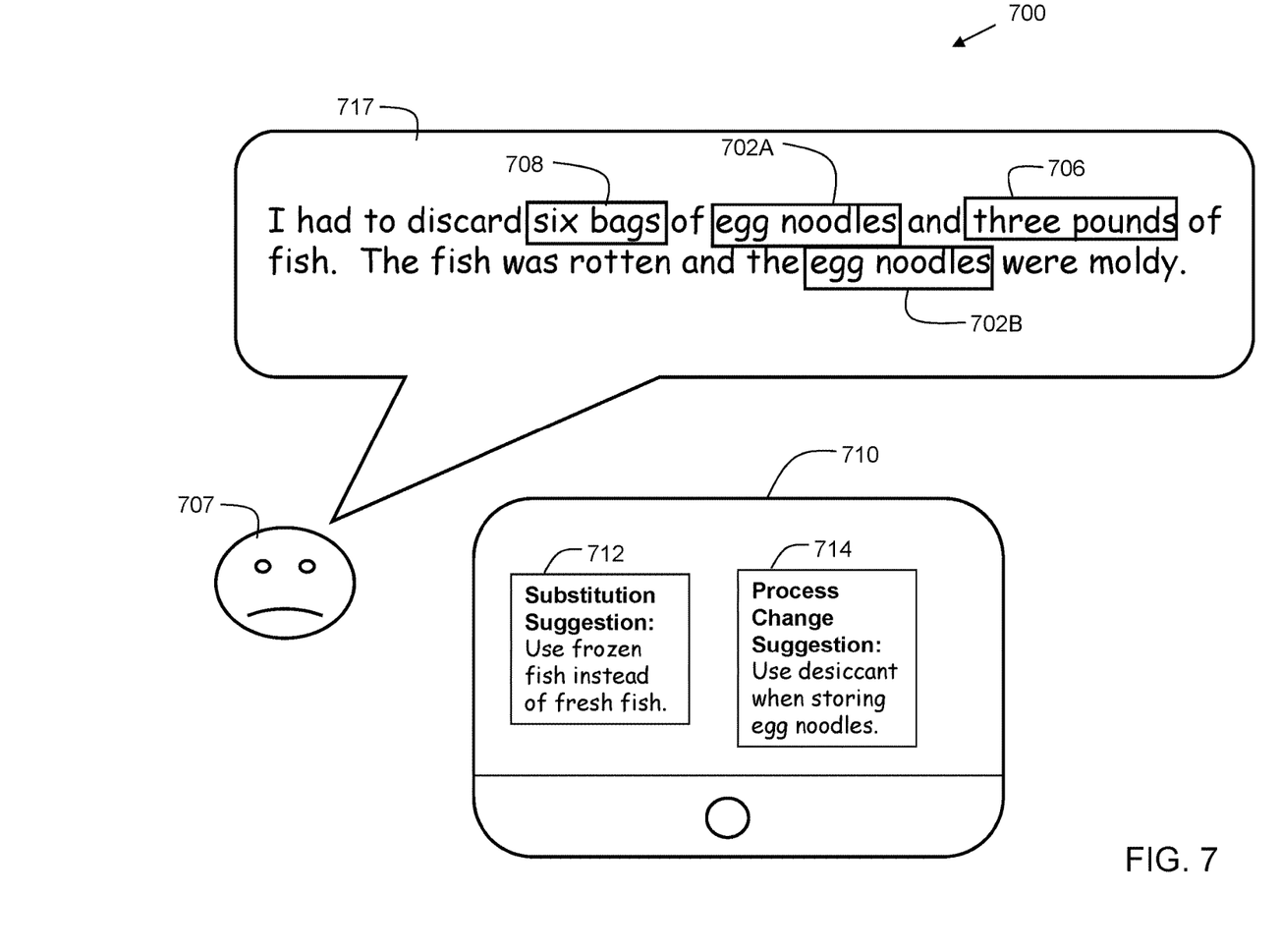
FIG. 7 shows an example of a natural language processing embodiment of the present invention.

FIG. 7 shows an example 700 of a natural language processing embodiment of the present invention. In embodiments, acquiring metadata for a discarded product comprises natural language processing. A natural language description of a discarded product is received. In some embodiments, the natural language description may be received in a form of user input of text. In some embodiments, the natural language description may comprise a speech fragment. A speech-to-text process is performed on the speech fragment prior to performing the natural language analysis.

A natural language analysis of the natural language description is performed to identify one or more discarded products within the natural language description. An entity detection process is performed for the natural language description. The entity detection can include noun identification, followed by identifying a subset of nouns including proper nouns, and nouns deemed to be topically pertinent. The entity detection can include identification of entity relationships. Entity relationships can include, but are not limited to, "is a kind of," "entails," "pertains to," "is a member of," "is a part of," "is an instance of," "causes," "is an opposite of," and others. In some embodiments, entities can have more than one entity relationship between them. Other entity relationships are possible.

In embodiments, performing a natural language analysis includes performing at least one of bigram processing, disambiguation, part-of-speech analysis, and anaphora resolution.

The example 700 further illustrates the use of a bigram analysis in accordance with embodiments of the present invention. In a bigram analysis, a pair of words in a particular order may be searched within a body of text of an input query. In this example, a user 707 utters a phrase 717 that is converted from text to speech to form a text excerpt. The bigram "egg noodles" is located within the text excerpt. Two occurrences, indicated as 702A and 702B, are present in the text passage. In embodiments, the usage of bigrams, trigrams, or more generally, n-grams, may be used to improve relevance in processing a natural language input query. Thus, embodiments include performing a computerized natural language analysis process to derive sentence classifications on the input query by performing a bigram analysis.

The natural language analysis process can include, but is not limited to, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to). Additionally, the natural language analysis process can include the use of trained classifiers, including, but not limited to, decision trees, naive Bayes classifiers, Maximum Entropy classifiers, decision trees, and/or support vector machines.

In embodiments, generating the report further includes generating a substitution suggestion, as shown at 712. In the example, a determination has been made that fresh fish is being discarded at a rate above a predetermined threshold. The waste product analysis system may include a database of substitutable products with a longer shelf life. The database can include the information that frozen fish has a longer shelf life than fresh fish, and that frozen fish can be used as a substitute for fresh fish. Accordingly, a suggestion is generated to use frozen fish instead of fresh fish.

In embodiments, generating the report further includes generating a process change suggestion, as shown at 714. In the example, a determination has been made that egg noodles were discarded. A suggestion is generated to use desiccant when storing egg noodles in the future. The desiccant will keep the egg noodles fresh longer. The suggestion may be generated by a crawl of the Internet for information about storing egg noodles. The suggestion may originate from information stored in a knowledge base within the waste product analysis system. Alternatively, entities, fragments, bigrams, etc., detected during language processing may be used as keywords for searching in the web crawl. It should be recognized that web crawling is an example of how information may be located, and that any other suitable mechanism may be substituted.

Figure 8:
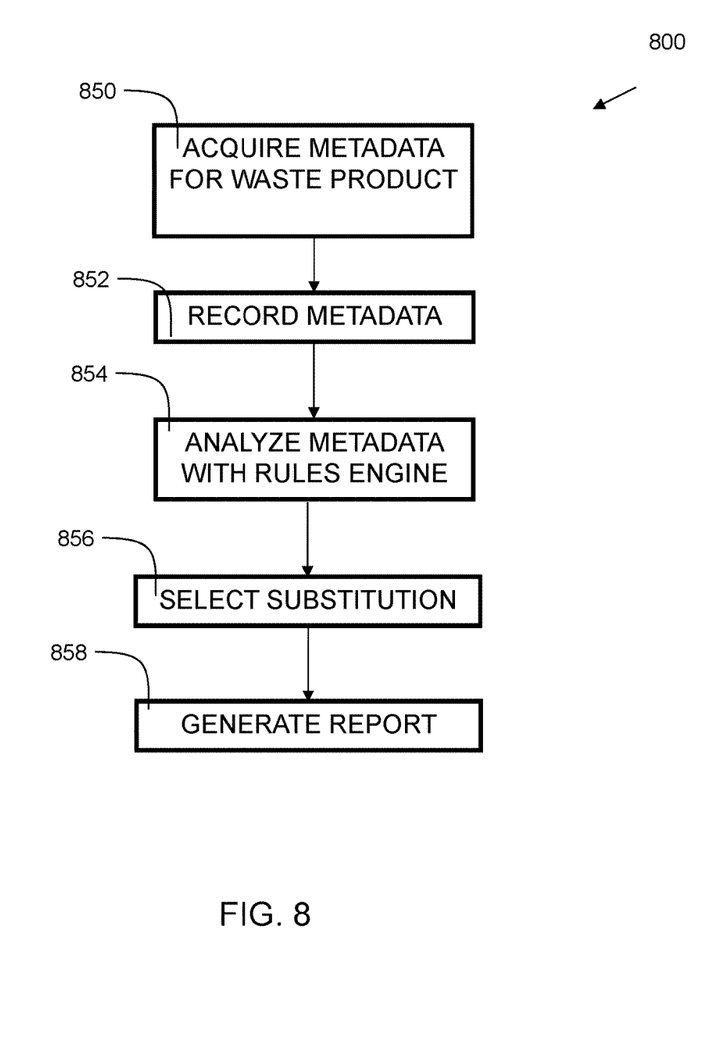
FIG. 8 is a flowchart indicating process steps for embodiments of the present invention.

FIG. 8 is a flowchart 800 indicating process steps for embodiments of the present invention. Metadata is acquired for a product, at 850. The metadata can include product type, product quantity, and/or product cost, among others. The acquiring of the metadata can come from images that are acquired on a mobile device of a worker. Thus, a worker can photograph discarded food products. If barcodes, QR codes, and/or product numbers are present on the packaging and/or directly on the discarded food products, the waste product analysis system can use those codes to retrieve information about the product being discarded. In some embodiments, the metadata can be acquired through a natural language process. Thus, a user may speak into their mobile device regarding what is being discarded. Speech-to-text and natural language processing can be used to extract the metadata from the spoken words of the worker. Metadata is recorded, at 852. The recording of metadata can be performed by storing the metadata in a database. In embodiments, the database uses a structured query language (SQL) format to store/retrieve data. Metadata is analyzed with a rules engine, at 854. The rules engine can establish a variety of operating parameters, such as weighting factors for various conditions. For example, a sports team schedule may have a weighting factor of 2, while a blizzard forecast from a weather forecast server may have a weighting factor of 5, indicating that the blizzard forecast has a greater impact on the potential for waste than a sports team schedule. Similar weighting factors can be used for social media and traffic. In embodiments, a waste potential score W is computed as follows:

$$W = K1(S) + K2(F) + K3(M) + K4(T); \text{ where:}$$

S is a sports schedule score;
F is a weather forecast score;
M is a social media score;
T is a traffic score; and
K1, K2, K3, and K4 are weighting factors.

The sports schedule score S is a numeric measure of a predicted impact of sports schedules on waste. As an example, when a local NFL football team has a bye week, the sports schedule score S may increase, since there can be less demand for food when the team is not playing on a particular weekend.

The weather forecast score F is a numeric measure of a predicted impact of weather forecasts on waste. As an example, when a blizzard or tropical storm is predicted, the weather forecast score F may increase, since there can be less demand for food when the weather is poor since less people may choose to go out to a restaurant. The waste product analysis system may import natural language weather forecasts, METAR weather codes, or other suitable formats for weather forecasting and reporting.

The social media score M is a numeric measure of a predicted impact of social media trends on waste. As an example, if a particular product is trending downward on social media (e.g. food with trans fats), the social media score may increase, since there can be less demand for food of the type that is trending downward.

The traffic score T is a numeric measure of a predicted impact of traffic on waste. As an example, if a particular road is blocked, based on a traffic report, the traffic score T may increase, since there can be less consumption of food if people cannot access a restaurant due to traffic.

A substitution is selected, at 856. The substitution can be based on a database of substitutable products. As an example, fresh carrots may be replaced with frozen carrots, canned carrots, or some other form of carrots. In some cases, the substitution can be for a different product altogether. For example, if the waste product analysis system detected a large amount of red oak lettuce being discarded, the substitution of spinach can be suggested, since spinach has a longer shelf life than red oak lettuce.

A report is generated, at 858. The report can include, but is not limited to, a cost of waste per meal, a potential waste indicator, an average daily waste amount, a wholesale cost of waste per meal, and/or a waste trend chart. Other pieces of information may be included in some embodiments, including the location of the reported waste, the worker that reported the waste, and the like.

As can now be appreciated, disclosed embodiments provide improved computer-implemented techniques for identifying, predicting, and reducing waste in a process. While examples disclosed herein pertained to food waste, other (non-food) processes may also benefit from embodiments of the present invention. For example, a manufacturing process that uses epoxy can benefit from an automated waste analysis in accordance with embodiments of the present invention. Various other use cases are possible. Natural language processing and/or image analysis make it simple and convenient for users to input wasted ingredients and quantities. They simply take photos of waste or describe the waste in natural language terminology. The computer-implemented techniques determine the waste based on the user input and perform an analysis. Social media trends, point of sale data, weather, traffic, geolocation data, and other external factors can be used to further enhance the analysis. Thus, the disclosed embodiments can be used to identify, predict, and reduce waste in a variety of industries and applications.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for identifying waste in a process, comprising:
   receiving an image of one or more discarded products from a camera;
   performing an object count process on the received image to identify an amount of the one or more discarded products within the image;
   acquiring metadata relating to the identified amount of the one or more discarded products from the received image;
   obtaining an amount of used product;
   recording the metadata;
   determining an overage amount of product as a function of the acquired metadata and a factor of the amount of used product;
   deriving a suggestion for waste reduction based on the determination; and
   generating a report based on the recorded metadata, wherein the report includes the suggestion for waste reduction.

2. The method of claim 1, wherein the acquiring the metadata comprises:
   receiving an image of a discarded product;
   performing an object recognition process on the received image to identify the one or more discarded products within the image; and
   extracting image metadata for the received image.

3. The method of claim 2, wherein performing an object recognition process on the received image comprises performing an edge detection process.

4. The method of claim 3, wherein performing an object recognition process further comprises performing a color analysis.

5. The method of claim 4, wherein performing an object recognition process further comprises using one or more image classifiers.

6. The method of claim 1, wherein acquiring metadata comprises acquiring metadata for a food product.

7. The method of claim 1, further comprising analyzing the metadata with a rules engine.

8. The method of claim 7, further comprising:
   receiving sales data for a predetermined time duration from a point of sale system; and
   determining the amount of used product during the predetermined time duration based on the received data; wherein the rules engine determines an overage amount of product as a function of the acquired metadata for the discarded product and a factor of the amount of used product.

9. The method of claim 1, wherein the acquiring the metadata comprises:
   receiving a natural language description of a discarded product;
   performing a natural language analysis of the natural language description to identify one or more discarded products within the natural language description; and
   performing an entity detection process for the natural language description.

10. The method of claim 9, wherein the natural language description comprises a speech fragment, and further comprising performing a speech-to-text process on the speech fragment prior to performing the natural language analysis.

11. The method of claim 9, wherein performing a natural language analysis includes performing at least one of bigram processing, disambiguation, part-of-speech analysis, and anaphora resolution.

12. The method of claim 1, wherein the generating the report further includes generating an indicator of potential waste.

13. The method of claim 12, further comprising using a social media trend to derive the indicator of potential waste.

14. The method of claim 12, further comprising using a weather forecast to derive the indicator of potential waste.

15. The method of claim 12, further comprising using a traffic report to derive the indicator of potential waste.

16. The method of claim 12, further comprising using a sports team schedule to derive the indicator of potential waste.

17. The method of claim 1, wherein the generating the report further includes generating a substitution suggestion.

18. The method of claim 1, wherein the generating the report further includes generating a process change suggestion.

19. A computer system comprising:
a processor;
a memory coupled to the processor, the memory containing instructions, that when executed by the processor, perform the steps of:
receiving an image of one or more discarded products from a camera;
performing an object count process on the received image to identify an amount of the one or more discarded products within the image;
acquiring metadata relating to the identified amount of the one or more discarded products from the received image;
obtaining an amount of used product;
recording the metadata;
determining an overage amount of product as a function of the acquired metadata and a factor of the amount of used product;
deriving a suggestion for waste reduction based on the determination; and
generating a report based on the recorded metadata, wherein the report includes the suggestion for waste reduction.

20. A computer program product for identifying waste in a process, for an electronic computing device comprising a computer readable storage medium having program instructions embodied therewith, the program instructions executable by a processor to cause the electronic device to:
receive an image of one or more discarded products from a camera;
perform an object count process on the received image to identify an amount of the one or more discarded products within the image;
acquire metadata relating to the identified amount of the one or more discarded products from the received image;
obtain an amount of used product;
record the metadata;
determine an overage amount of product as a function of the acquired metadata and a factor of the amount of used product;
derive a suggestion for waste reduction based on the determination; and
generate a report based on the recorded metadata, wherein the report includes the suggestion for waste reduction.

* * * * *